April 27, 1926.

V. L. GIBSON 1,582,516

BELT TIGHTENER AND GUIDE

Filed May 25, 1925    2 Sheets-Sheet 1

INVENTOR,
Victor L. Gibson
BY
ATTORNEY.

April 27, 1926.

V. L. GIBSON 1,582,516

BELT TIGHTENER AND GUIDE

Filed May 25, 1925

INVENTOR,
Victor L. Gibson
BY
*A. T. Martell*
ATTORNEY.

Patented Apr. 27, 1926.

1,582,516

UNITED STATES PATENT OFFICE.

VICTOR L. GIBSON, OF LOS ANGELES, CALIFORNIA.

BELT TIGHTENER AND GUIDE.

Application filed May 25, 1925. Serial No. 32,732.

*To all whom it may concern:*

Be it known that I, VICTOR L. GIBSON, a citizen of the United States, residing at Los Angeles, in the county of Los Angeles and State of California, have invented new and useful Improvements in Belt Tighteners and Guides, of which the following is a specification.

My invention relates to belt tighteners and more particularly to a form of belt tightener and guide which is adapted for use with chain-belts as well as with rubber or leather belts.

The primary object of my invention is to provide a belt tightener and guide which will insure a uniform tension of driving belts and chains in operating machinery.

Another object of my invention is to eliminate shocks in belt driven machinery when the direction of rotation is reversed, and also to eliminate the swaying and whipping of belts due to excessive slack therein.

Another object is to provide a belt tightening device in which the idling feature and the guide feature are self controlling, that is, are independent of all fastenings which would interfere with the belt movement.

Another object is to provide for constant and uniform lubrication of operating parts in connection with chain-belts and sprocket wheels.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof:

Figure 1:
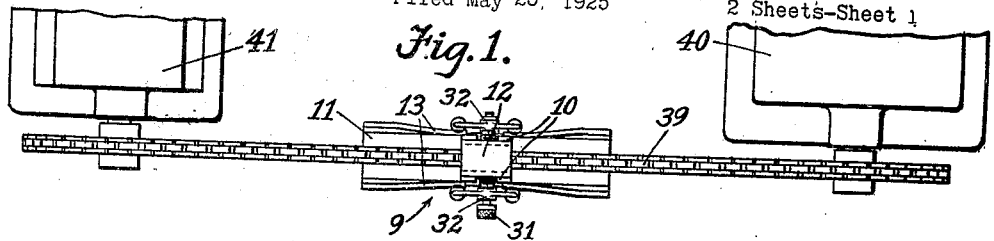
Fig. 1 is a plan view of a belt tightener and guide, embodying the principles of my invention, applied to a chain-belt connecting a driving and a driven machine.

The form of belt tightener shown in Figs. 1 to 4 inclusive is designed for use with a horizontal chain-belt and consists of a vertical frame 9 built of four parallel vertical guide bars 10, an equally spaced pair on each side of the frame, the lower ends of which are fixed to a relatively long piece of channel iron 11, serving as a base plate, and the upper ends of which are fixed to a relatively short piece of channel iron 12, serving as a spacer. Braces 13, extending between the ends of base plate 11 and approximately the middle points of guide bars 10, serve to hold the latter rigidly fixed to the former and to prevent any tipping of the guide bars endwise with reference to the base plate.

A pair of upper bearing blocks 14 and a pair of lower bearing blocks 15 are mounted between guide bars 10, each of said bearing blocks being made up of a middle plate 16, slightly thicker than guide bars 10, and two side plates 17 secured to the middle plate by bolts 18 extending through all three of the plates, said side plates being sufficiently wider than said middle plate to extend laterally beyond it as at 19, so as to overlap guide bars 10, thus retaining the bearing blocks as a whole between the guide bars so that it is slidable vertically thereon.

Transverse shafts 20 and 21 are journaled in the upper and lower pairs of bearing blocks respectively and idler sprocket wheels 22 and 23 are keyed to said shafts 20 and 21 respectively, between the individual blocks of each pair. Each of said transverse shafts is provided with a collar 24 at one end and a transverse aperture 25 near the other adapted to receive a cotter pin. An axial bore 26 extends from the collared end of each shaft to a point near its opposite end and apertures 27, spaced so as to coincide in position with the transverse center of middle plates 16 of the bearing-blocks, are drilled radially through the shaft so as to communicate with said axial bore. Horizontally extending bores 28, opening against the adjacent edges of guide bars 10, are drilled through middle plates 16 in position to register with apertures 27 at some point of their revolution with the shaft. A third radial aperture 29 is drilled through each shaft at about its longitudinal center so as to coincide with a radial bore 30 provided on each idler sprocket, the outer end of said radial bore terminating between the sprockets of the idler so that links of a chain engaging therewith will come in contact with said bore opening as shown in Fig. 4.

The outer ends of bores 26 in shafts 20 and 21 are screwthreaded to receive a grease cup 31, which supplies grease through axial bores 26, apertures 27 and bores 28 to the bearing blocks and guide bars, and through aperture 29 and bore 30 to the chain and sprocket wheels.

Loose bearings 32 with laterally extending arms 33 are mounted on the ends of shafts 20 and 21 adjacent the outer side of bearing blocks 14 and 15, said loose bearings being retained on one end of the shafts by collars 24 and on the other by washers 34 and cotter pins 35.

Figure 2:
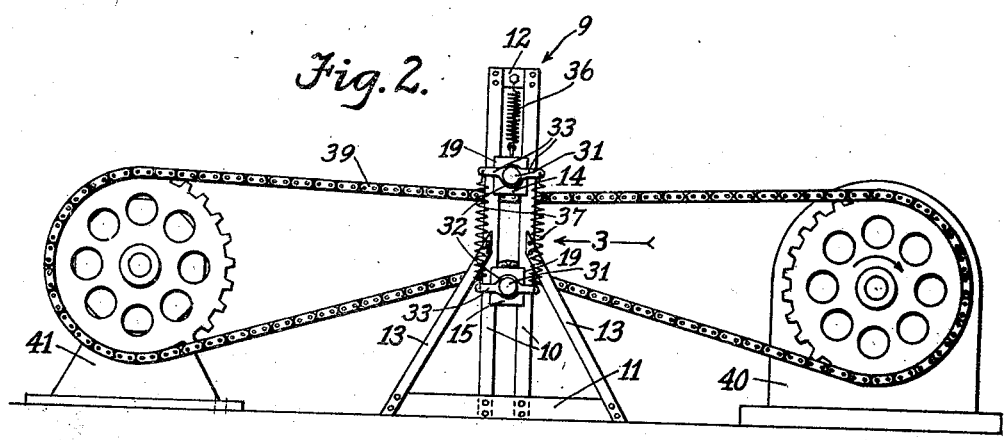
Fig. 2 is a side view of the belt tightener and chain-belt shown in Fig. 1.
Figures 3, 4:
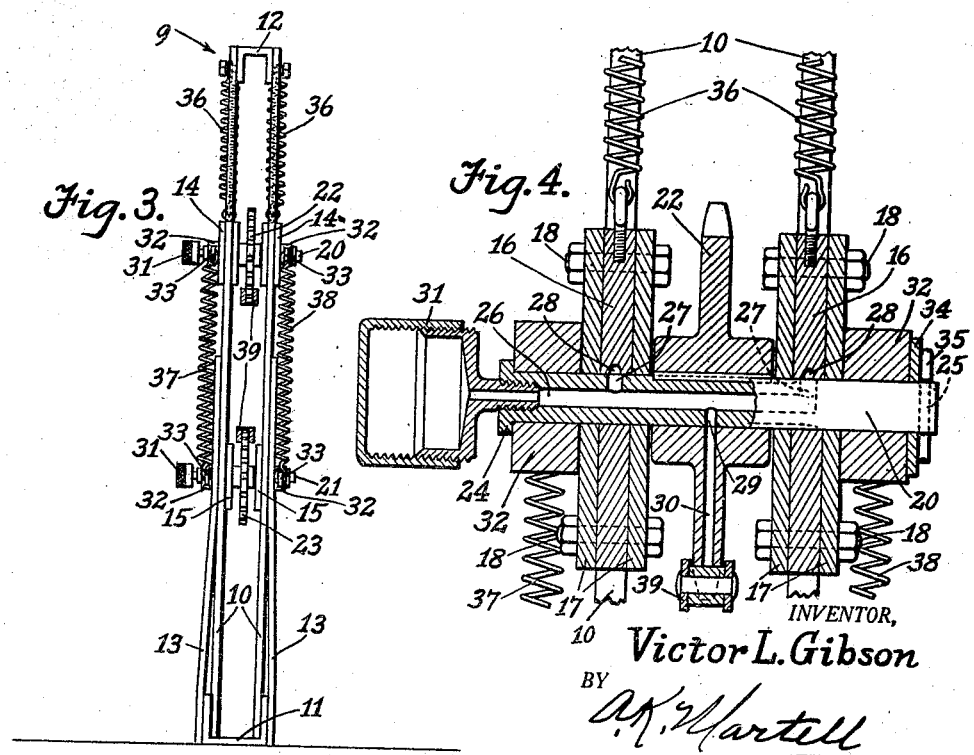
Fig. 3 is an enlarged end view of the belt tightener and guide, as seen looking in the direction indicated by arrow 3 in Fig. 2.
Fig. 4 is an enlarged vertical sectional view, at right angles to the chain-belt, through the upper idler sprocket and bearing-block shown in Figs. 2 and 3.

Counterbalancing springs 36, having just sufficient tension to balance the weight of the bearing blocks and associated parts, have their upper ends attached to channel piece 12 and their lower ends to upper bearing blocks 14 as shown in Figs. 2, 3 and 4, and pairs of regulating springs 37 and 38, on opposite sides of frame 10, have their upper ends attached to arms 33 of an upper bearing 32 and their lower ends attached to arms 33 of a lower bearing 32 on the same side thereof. The tension of these latter springs is so adjusted that the upper and lower idler sprockets are resiliently maintained in such spaced relation to each other as to take up any slack in the chain-belt 39 running between them without causing sufficient tautness therein to produce undue friction.

As illustrated in Figs. 1 and 2 the belt tightener is preferably placed midway between an engine or a motor 40 and a rotary pump 41 or other machine. It may, however, be placed in different positions in relation to the driving and driven machines with similar good results.

Figure 5:
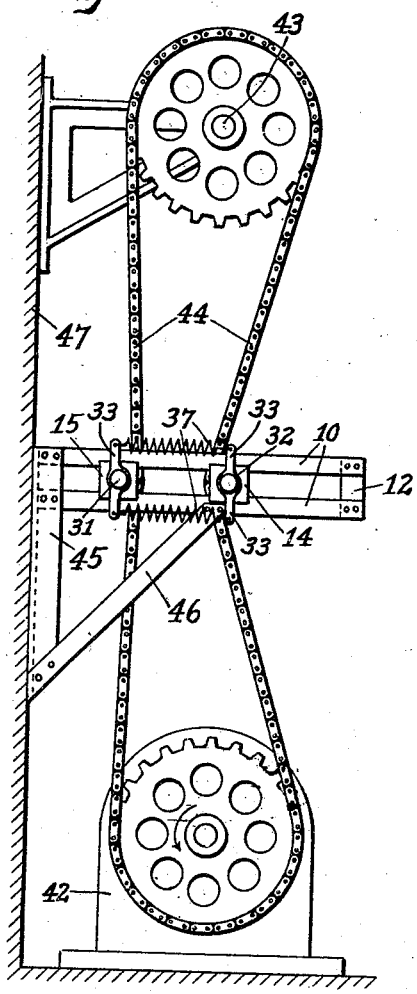
Fig. 5 is a side view, similar to Fig. 2 of my belt tightener and guide, modified for use with a vertical chain-belt.

The modified form of belt tightener and guide shown in Fig. 5 is adapted for a vertical chain belt, as might be used between a motor 42 and a line shaft 43. In this case the guide bars 10 extend horizontally across the path of the chain-belt 44 and are secured to a frame-piece 45 and brace 46 suitable for attachment to a wall 47 or post. The bearing blocks, idler sprockets, regulating springs and associated parts are arranged in the same way with reference to the guide bars as in the form already described. No counterbalancing springs being required in this case, however, because of the horizontal position of the guide bars, they are not shown here.

Figure 6:
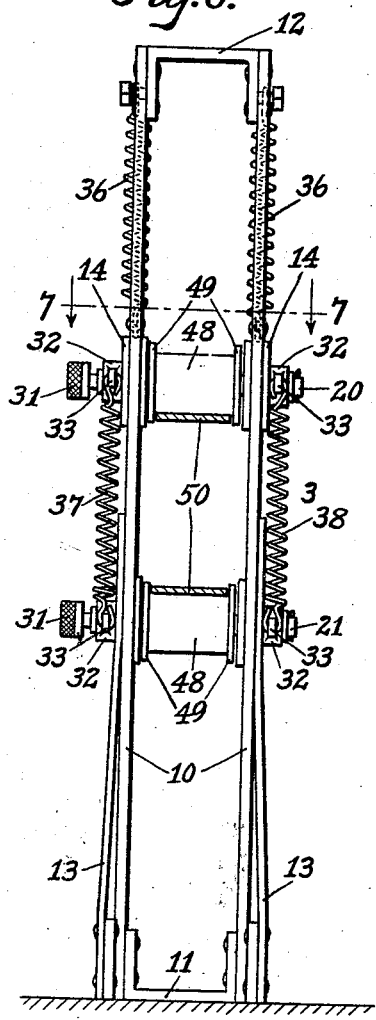
Fig. 6 is an end view, similar to Fig. 3 of my belt-tightener and guide, modified for use with a horizontal rubber or leather belt.
Figure 7:
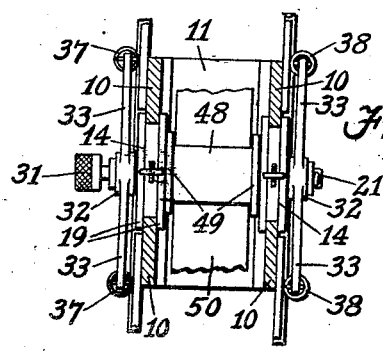
Fig. 7 is a sectional view of the belt tightener shown in Fig. 6, on line 7—7 of that figure.

The form of belt tightener shown in Figs. 6 and 7 is similar to that shown in the first four figures except that idler pulleys 48 with end flanges 49, adapted to control a rubber or leather belt 50, are substituted for the idler sprockets in those figures. Similar provisions are made in this case for lubricating the guide bars and bearings, no provision being necessary, of course, for lubricating the belt here as is shown with the chain-belt.

Modified forms of the belt tightener similar to that shown in Fig. 5, but provided with idler pulleys instead of idler sprockets, may be made for vertical belts other than chain-belts. It is evident that my belt tightener and guide may be adapted also for use with belts of any kind which run at any angle between the horizontal and vertical positions shown in the drawings and that the counterbalancing springs may be omitted from the device in all cases where the belt runs vertically or at an angle greater than 45 degrees to the horizontal. It may, therefore, be used in connection with practically all forms of belt driven machinery and is especially useful with chain-belts in rotary drill machinery for oil well work, in rock-crushing machinery, in auto-truck driving mechanisms and the like.

My belt tightener and guide operates to hold the belt at a uniform tension in proper alignment with the driving and driven pulleys, the bearing blocks, under the influence of the counterbalancing springs and the regulating springs, adjusting themselves on the guide bars to take up the slack in the loose side of the belt when running in either direction.

Having thus illustrated and described my invention, I claim:

A belt tightener and guide for use with belt driven machinery, comprising a frame having two pairs of parallel guide bars, two pairs of bearing blocks slidably mounted between said guide bars, two transverse shafts journaled in said bearing blocks, an idler wheel mounted on each of said transverse shafts between its bearing blocks, loose bearings mounted on the ends of said transverse shafts adjacent said bearing blocks, laterally extending arms formed integral with said loose bearings and helical springs connected to said arms so as to extend between adjacent ends of said transverse shafts, whereby said idler wheels are resiliently held in contact with the two sides of a belt running between them.

VICTOR L. GIBSON.